Figure 1:
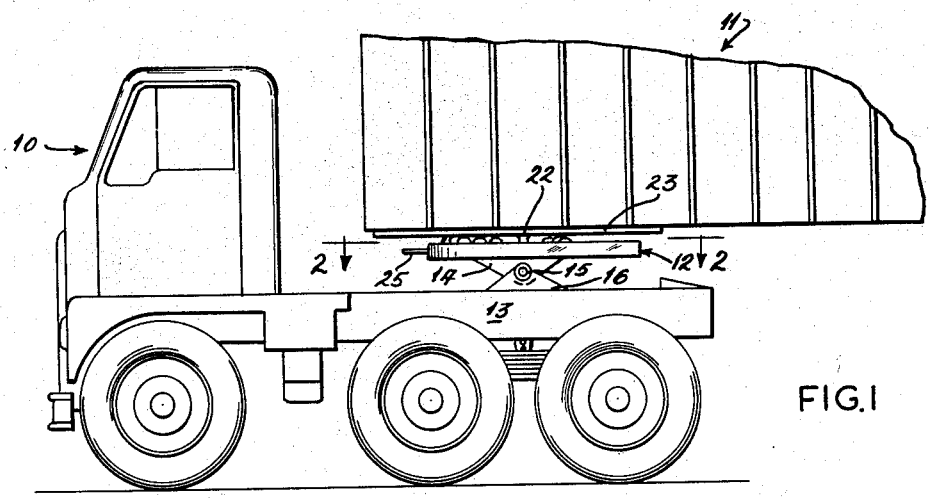

Aug. 25, 1964       J. I. GIST       3,146,040

FIFTH WHEEL

Filed Feb. 14, 1963

INVENTOR:
JOHN I. GIST,
BY
Gravely, Lieder & Woodruff
ATTORNEYS,

United States Patent Office 3,146,040
Patented Aug. 25, 1964

3,146,040
FIFTH WHEEL
John I. Gist, St. Charles, Mo.
(400 MacArthur, Washington, Mo.)
Filed Feb. 14, 1963, Ser. No. 258,409
1 Claim. (Cl. 308—222)

The present invention relates to fifth wheels for tractor-trailer trucks and particularly to a novel fifth wheel having a plurality of suspended anti-friction elements, preferably rollers, mounted therein.

There have been many attempts to provide fifth wheel constructions with anti-friction elements to make the turning of a drive vehicle with respect to an attached trailer easier. However, all of the prior devices have been unsatisfactory for use with conventional modern tractor-trailer constructions. The prior devices have been very expensive, cumbersome, difficult to construct, or mounted on the trailer section, and, in addition, all of the known devices employ anti-friction elements which roll between two metal surfaces, which is an unsatisfactory arrangement.

Most States have laws which limit the overall length of a tractor-trailer combination and in order to get more carrying capacity, manufacturers have shortened the tractor component by moving the cab directly over or in front of the front axle. While this construction gives greater capacity and length for the trailer component, it introduces severe steering problems into the tractor-trailer combination. Specifically, the tractor driver has no leverage to use in steering the tractor, and consequently the tractor-trailers are difficult to steer, particularly if the road is slippery or if the tractor becomes locked with respect to the trailer during turning.

In view of the inadequacies of the prior art fifth wheels having anti-friction elements, in conventional present day tractor-trailers the fifth wheel is locked to the trailer by a king pin and a plate on the underside of the trailer mates with the top surface of the fifth wheel. These mating surfaces are lubricated, however, when the tractor and trailer become engaged, the lubricant often is wiped from the surface. Also, tractors often are driven alone or left in exposed locations, and the grease on the fifth wheel is washed away by the elements or becomes contaminated with foreign objects such as dust, rocks, etc. Under these conditions, the tractor becomes locked to the trailer through the fifth wheel engagement because of friction between the trailer plate and the top of the fifth wheel, and serious accidents with consequent danger to the driver and damage to the tractor and the load may readily occur.

Another important consideration is that the same tractor often is used to haul many different makes of trailers, and the trailers often stand idle during loading or unloading, etc. Therefore, the fifth wheel and the anti-friction elements must be mounted on the tractor in order to provide the most efficient utilization of equipment. Furthermore, the fifth wheels are presently mounted on the tractors and any improvement must be adapted to this type modern arrangement.

Accordingly, it is a principal object of the present invention to provide a fifth wheel construction having a plurality of suspended rollers positioned therein so as to protrude above the top surface of the fifth wheel and to minimize friction between the trailer and the fifth wheel.

It is another object of the present invention to provide a novel lubrication system for the rollers and their pins whereby the rollers are freely rotatable at all times.

Still another object of the present invention is to provide a fifth wheel which is easily lubricated, and wherein the roller elements may be replaced simply and which results in easy steering of a tractor-trailer combination.

These and other objects and advantages will become apparent hereinafter.

The present invention comprises a fifth wheel having a plurality of rollers suspended therein with one surface thereof protruding above the top surface of the fifth wheel. The present invention further comprises the fifth wheel construction hereinafter described and claimed.

Figure 2:
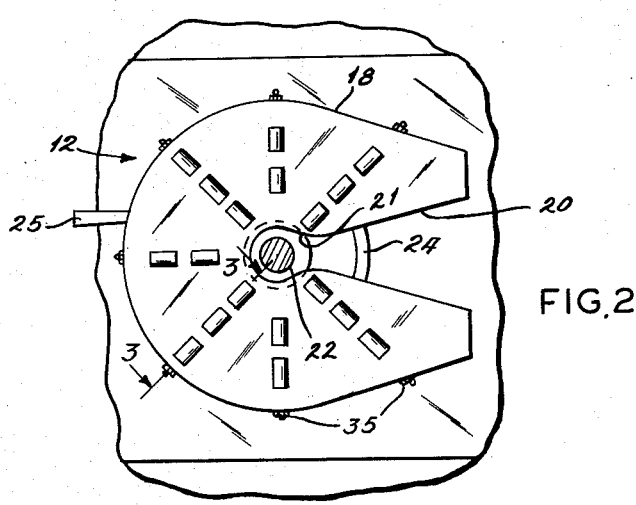
Figure 3:
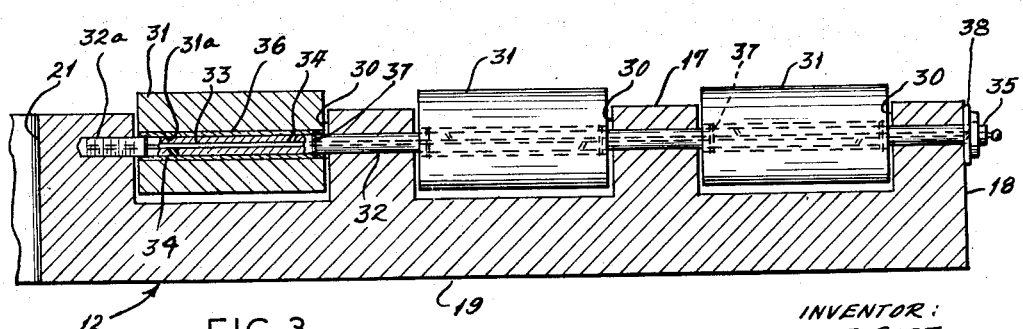

In the drawings wherein like numerals refer to like parts wherever they occur:

FIG. 1 is a fragmentary elevational view of a tractor-trailer combination embodying the present invention, FIG. 2 is a fragmentary plan view taken on line 2—2 of FIG. 1 and shows the fifth wheel, and FIG. 3 is a partially broken sectional view taken along line 3—3 of FIG. 2.

FIG. 1 shows a tractor 10 engaged with a trailer 11 by means of a fifth wheel 12 pivotally mounted on the tractor frame 13. The fifth wheel 12 comprises legs 14 mounted on the under surface thereof and engaged by a pin 15 in a pair of brackets 16 mounted on the tractor frame 13. The fifth wheel 12 is rotatable about the pin 15.

The fifth wheel 12 includes a body or base plate defined by a top surface 17, an edge surface 18, and a bottom surface 19, and is provided with a V-shaped opening 20 in the rear end thereof. The opening 20 communicates with a generally centrally located king pin opening 21. The V-shaped opening 20 is known as a king pin fork.

The trailer 11 includes a king pin 22 centrally mounted on the under surface of the trailer plate 23. When the tractor 10 is backed into engagement with the trailer 11, the king pin 22 is engaged by the king pin fork 20, which guides the king pin 22 into the center opening 21. A conventional spring activated block pin 24 closes the king pin fork 20 to secure the king pin 22 to the fifth wheel 12. When the trailer 11 and tractor 10 are to be disengaged, a conventional king pin release lever 25 is actuated to retract the lock pin 24 and open the fork 20 so that the tractor 10 can be driven away from the trailer 11. This mechanism is standard on present fifth wheel constructions and is not descrbied in detail as it forms no part of the present application.

The fifth wheel 12 is provided with a plurality of aligned groups of spaced pockets 30 which radiate axially from the center opening 21. Rollers 31 are suspended in the pockets 30 by axles 32 which pass through the fifth wheel end wall 18 and are in threaded engagement with the body of the fifth wheel 12 adjacent to the center opening 21. The pockets 30 may extend completely through the body of the fifth wheel 12, if desired. However, as shown the under surfaces of the rollers 31 are protected by the fifth wheel from road dirt and the like which may be thrown upward by the wheels. The pins 32 are provided with a central axial lubrication passage 33 and secondary passages 34 communicating the main passage 33 with the outer surface of the pin 32. A lubrication fitting 35 is provided on the outermost edge of each of the pins 32 and in conjunction with the passages 33 and 34 provides means for passing lubricant to the engaging surfaces of the pins 32 and the rollers 31. The pins 32 are non-rotatably fixed to the fifth wheel 12 by means of the threaded end 32a, and thus are easily removable and replaceable.

Preferably, the inner surfaces or pin openings 31a of the rollers 31 are provided with bearing members 36, such as press fit brass sleeves, to minimize wear on the rollers 31 and the pins 32. The pins 32 and the rollers 31 are made of high quality steel.

Dust caps or O rings 37 are positioned in sealing engagement between the outer surface of the axle 32 and the inner surface of the sleeve 36 adjacent to the opposite ends of the sleeve 36. The O rings 37 may be recessed in the bearing surface sleeve 36. The seals 37 keep contaminants from entering the bearing area between the axle 32 and the sleeve 36 and retain lubricant in the bearing area.

A lock washer 38 is positioned between the head of the axle 32 and the outer surface 18 of the fifth wheel 12 to lock the axle 32 to the fifth wheel 12.

In order to minimize obstructions and locking of the rollers 31, one surface thereof protrudes above the top surface 17 of the fifth wheel 12 to engage the trailer plate 23. None of the other surfaces of the rollers 31 is in engagement with any other portion of the fifth wheel 12. This is important, since it minimizes any possibility of the rollers 31 locking. Also, lubrication is done internally between the pins 32 and the rollers 31 or the bearing members 36, so that foreign matter cannot become lodged between the rotating parts, and the lubricant cannot easily be contaminated.

Thus it is apparent that the present invention provides a fifth wheel construction which achieves all of the objects and advantages sought therefor.

This invention is intended to cover all changes and modifications of the example of the invention herein chosen for purposes of the disclosure, which do not constitute departures from the spirit and scope of the invention.

What is claimed is:

A fifth wheel construction comprising a base plate having a substantially centrally located opening and provided with a plurality of aligned groups of pockets in one surface thereof, axles fixed to the base plate, each axle passing through a group of aligned pockets, a plurality of rollers provided with central passages, bushings fitted to the passages, the rollers and bushings being rotatably journaled on the axles and suspended within the pockets so as to protrude above the surface of the base plate, and lubrication fittings positioned on one end of the axles and in a side wall of the base plate, the axles being provided with lubricating passages communicating the lubrication fitting with the interior surfaces of the bushings.

References Cited in the file of this patent

UNITED STATES PATENTS

| | | |
|---|---|---|
| 1,112,012 | Laughlin | Sept. 29, 1914 |
| 1,364,322 | Rowan | Jan. 4, 1921 |
| 2,193,744 | Shriver | Mar. 12, 1940 |
| 2,332,659 | Musschoot | Oct. 26, 1943 |
| 2,647,618 | McLachlan | Aug. 4, 1953 |
| 3,091,501 | Satrum | May 28, 1963 |

FOREIGN PATENTS

| | | |
|---|---|---|
| 983,166 | France | Feb. 7, 1951 |